July 28, 1953 — A. Y. DODGE — 2,646,862
AIR-COOLED BRAKE
Filed March 4, 1949 — 3 Sheets-Sheet 1
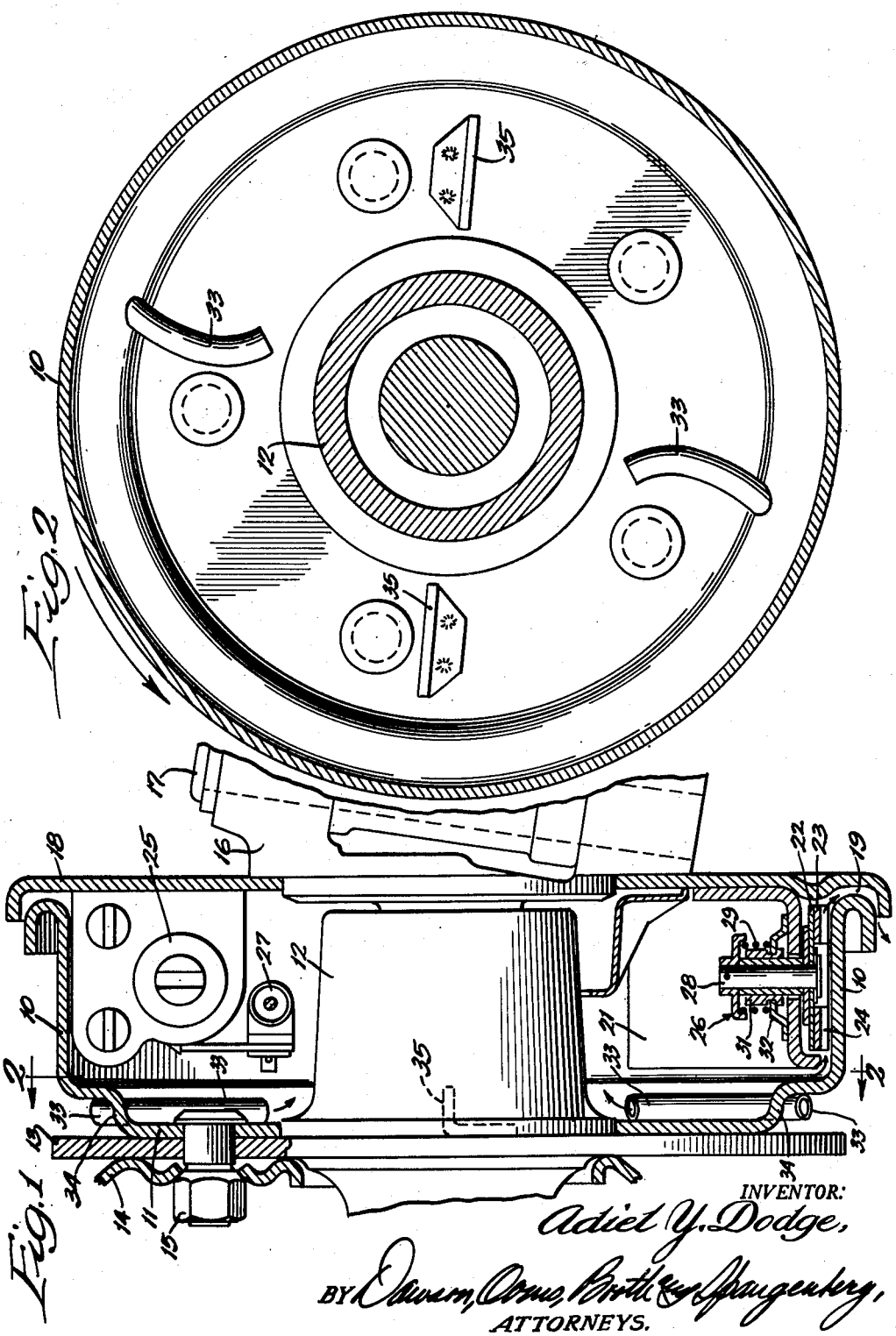
INVENTOR:
Adiel Y. Dodge,
BY Dawson, Ooms, Booth & Spangenberg,
ATTORNEYS.

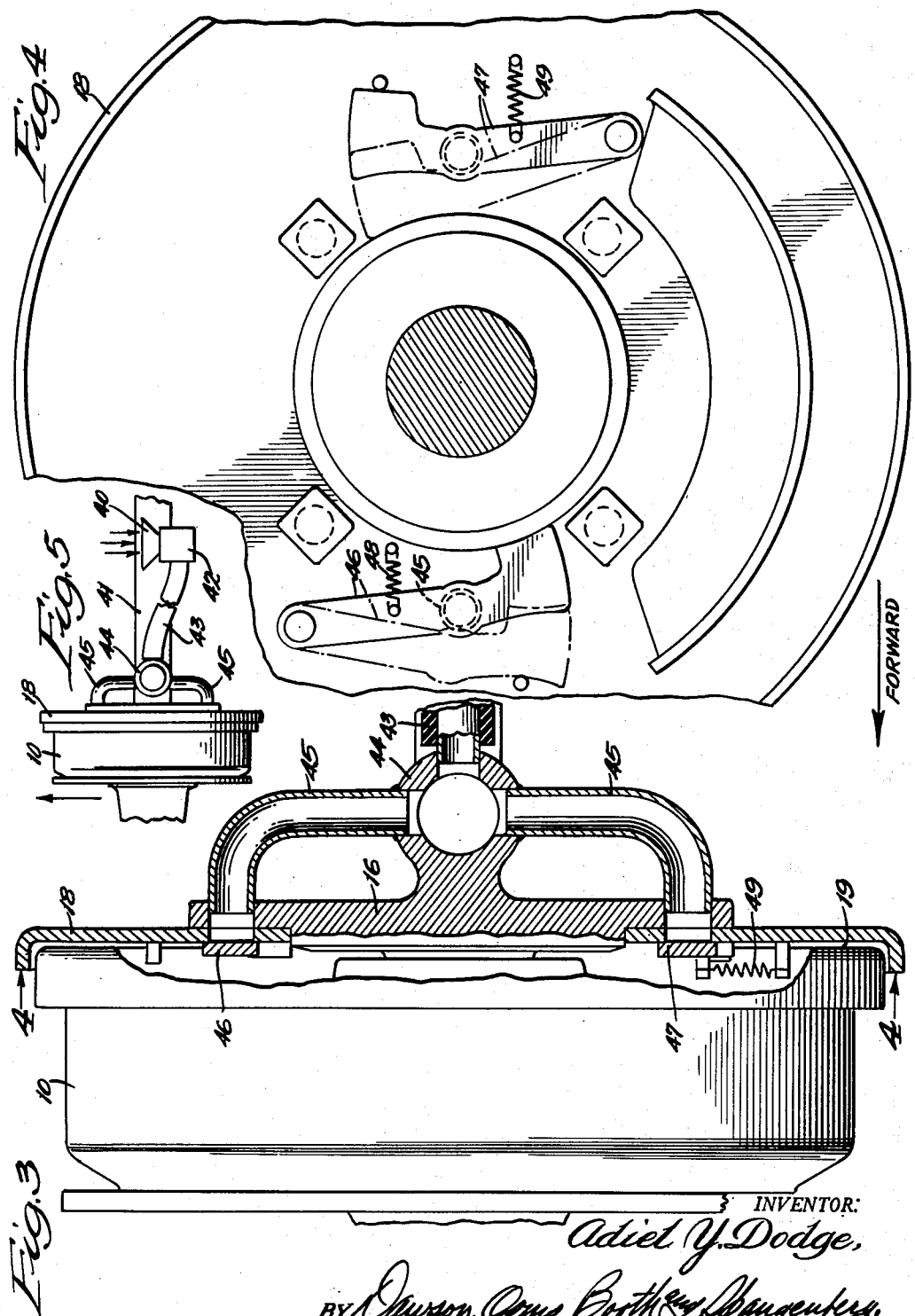

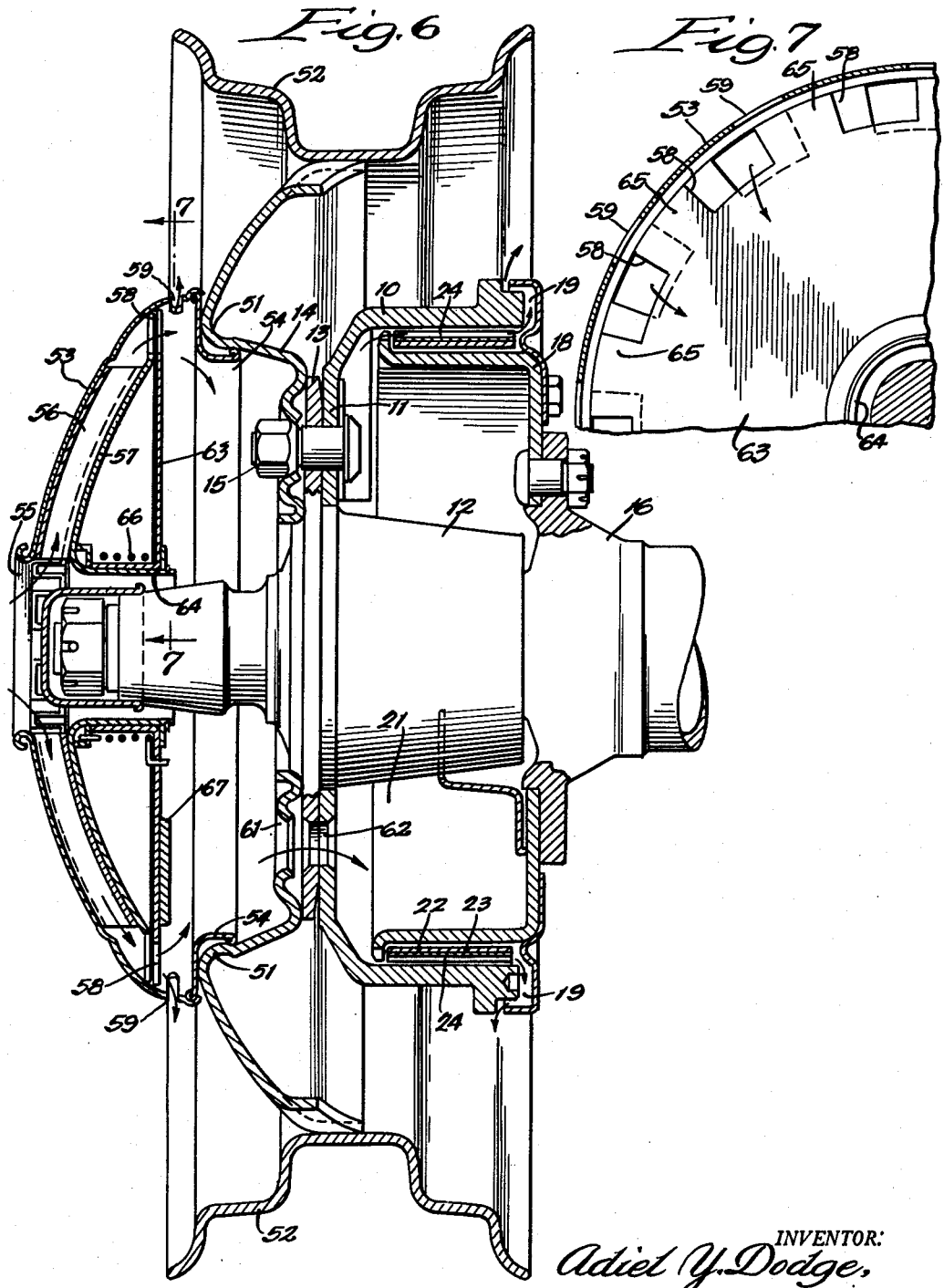

Patented July 28, 1953

2,646,862

UNITED STATES PATENT OFFICE 2,646,862

AIR-COOLED BRAKE

Adiel Y. Dodge, Rockford, Ill.

Application March 4, 1949, Serial No. 79,652

5 Claims. (Cl. 188—264)

This invention relates to brakes and more particularly to the cooling of vehicle brakes.

It has been found that the most effective cooling of vehicle brakes is by the flow of cool air through the interior of the brake structure and preferably in direct contact with the brake drum surface as more fully explained in my copending application Serial No. 73,875, filed February 1, 1949, and now abandoned. It is undesirable, however, that air be admitted promiscuously to the brake since it will carry into the brake dust, grit, water and like foreign material. The dust and grit act as an abrasive on both the lining and the drum surface causing excessive wear while water wetting the braking surface is immediately detrimental to the effectiveness of the brakes.

It is accordingly one of the objects of the present invention to provide a brake in which air free of foreign material is circulated through the interior of the brake to cool it. Preferably, the air directly contacts an exposed portion of the brake drum surface for most effective cooling.

Another object is to provide a brake in which circulation of air is produced in response to movement of the vehicle, either by rotation of the brake drum or by linear movement of the vehicle itself through the air. According to one feature of the invention, foreign material carried by the air is removed therefrom prior to entry of the air into the brake.

Still another object is to provide a brake in which air is admitted through a conduit or conduits carried by the brake drum and rotatable therewith so that foreign material will be thrown out by centrifugal force prior to admission of the air into the brake. The separating effect of centrifugal force may be increased by sloping the conduit backwards relative to the direction of rotation of the drum.

A further object is to provide a brake in which flow of cooling air through the brake is controlled in response to deceleration of the vehicle. Preferably, the construction includes a valve mounted on the brake for movement in response to deceleration to control the flow of air into the brake.

A still further object is to provide a construction in which air is forced into the brake through and due to rotation of the hub cap and in which foreign material may be removed from the air centrifugally.

The above and other objects and advantages of the invention will be more readily apparent when read in connection with the accompanying drawings, in which—

Figure 1 is an axial section through a brake embodying the invention;

Figure 2 is a transverse section on the line 2—2 of Figure 1;

Figure 3 is a plan view with parts in section of an alternative construction embodying the invention;

Figure 4 is a partial section on the line 4—4 of Figure 3;

Figure 5 is a diagrammatic plan view of a brake installation on a vehicle;

Figure 6 is an axial section through another brake construction; and

Figure 7 is a partial section on the line 7—7 of Figure 6.

The brake, as shown in Figures 1 and 2, comprises a brake drum 10 having a cylindrical braking surface and a flat radial flange 11 by which the drum is supported on a rotatable wheel hub 12. The hub may have a flange 13 to which the flange 11 of the brake drum is secured and which also carries a wheel indicated partially at 14 by means of the usual mounting lugs 15. The hub 12 is rotatable on a spindle carried by a bracket 16 which is in turn carried by the vehicle. In the case of a rear wheel, the bracket 16 may be fixed while in the case of a front wheel, as shown, the bracket may pivot about a spindle 17 for steering movements of the wheel.

The bracket 16 carries a non-rotatable support or backing plate 18 adjacent the open end of the brake drum and preferably spaced therefrom to leave an annular outlet opening 19 from the interior of the brake drum. Within the brake drum the bracket carries one or more flange supports 21 which carries a series of brake segments 22. The construction, as shown, is substantially similar to that more particularly described and claimed in my copending application Serial No. 693,642, filed August 29, 1946, and now Patent Number 2,596,379, issued May 13, 1952, although the features of the present invention are applicable to other types of brake constructions. In the brake, as shown, the segments 22 carry a friction lining material 23 which is formed with spaced gaps as indicated at 24 forming air flow passages across the brake communicating at one end with the outlet passage 19 and at their opposite ends with the interior of the brake drum. The segments may be expanded into engagement with the brake drum by an actuating mechanism 25 which is illustrated as a hydraulic cylinder and may be urged out of engagement with the drum by spring return devices 26 and 27 which may be of the type more fully disclosed in my application Serial No. 693,642. The return devices 26 comprise pins 28 connected to the segments and urged outward of the flange supports 21 by a spring 29. The pins frictionally engage collars 31 which are connected to plates 32 carried by the flange supports through lost motion connections so that upon excessive movement of the brake segments the collars will slip on the pins automatically to adjust the brake clearance.

In order to admit air to the interior of the brake to cool the brake structure, tubes 33 are mounted in the brake drum extending generally radial thereof and having inlet openings 34 lying radially inward of the outlet opening 19. The tubes 33 extend into the interior of the brake drum to discharge air therein and preferably curve backward relative to the direction of rotation of the drum during normal forward operation of the vehicle, as seen in Figure 2. Circulation of air into and through the brake is facilitated by radially extending fins or flanges 35 secured to the interior of the brake drum to rotate therewith.

In operation, when the wheel and brake drum are turning, air within the brake drum will be caused to circulate by the fins 35 and will be forced out the outlet opening 19 by centrifugal force. This will draw air into the tubes 33, it being noted that the maximum whirling diameter of the tubes is less than the diameter of the outlet opening so that air will enter the tubes. As the air is picked up by the tubes and particularly due to the backward slope of the tube outer ends, any foreign material carried by the air which will obviously be several times heavier than the air itself will be thrown out of the tubes outward of the brake drum by centrifugal force. Thus the air which enters the brake drum through the tubes is substantially clean air carrying a minimum of water or solid foreign materials so that the interior of the brake will be kept clean and dry. The air entering the brake will flow through the gaps 24 across the exposed surface of the brake drum and out the outlet 19 to carry off heat at the point at which it is generated so that a highly effective cooling is provided.

The construction shown in Figures 3 to 5 is substantially similar to that of Figures 1 and 2 except for the manner of admitting the air, and parts identical with corresponding parts in Figures 1 and 2 have been indicated by the same reference numerals. In this construction a scoop 40 is mounted on a portion of the vehicle such as the axle or frame member 41 and faces in the forward direction of travel of the vehicle. Air picked up by the scoop passes through a filter 42 which will remove foreign material therefrom and is conducted through a hose 43 to a fitting 44 mounted above and in alignment with the spindle 17. From the fitting 44 the air flows through conduits 45 which open through the backing plate or support 18, as best seen in Figure 3 to conduct the air into the interior of the brake.

With this construction, as the vehicle travels forward the scoop 40 will pick up air which is cleaned in the filter 42 and which then flows through the hose 43, fitting 44 and conduits 45 into the interior of the brake drum. This air will flow out through gaps 24 in the brake and through the outlet 19 to cool the brake in the same manner as described above in connection with Figures 1 and 2. It will be noted that the quantity of air supplied increases with the vehicle speed so that the maximum amount of air is supplied when the vehicle is traveling at high speed which is when the maximum amount of cooling is required.

In order to control air flow through the brake so that air may be supplied only during a braking operation when heat is being generated, valve means may be provided responsive to deceleration of the vehicle. As best seen in Figure 4, this valve means comprises valve levers 46 and 47 extending generally vertically and overlying the outlet ports for the conduits 45. Assuming the forward direction of travel of the vehicle to be in the direction of the arrow in Figure 4, the lever 46 will be pivoted at its upper end to the backing plate 18 and urged clockwise by a spring 48. The lever 47 is pivoted at its lower end to the backing plate and is urged clockwise by a spring 49. In the normal position, as shown in Figure 4, the springs will hold the levers in a position to close the ports in the backing plate with which the conduits 45 communicate so that no air can enter the brake. During a brake application when forward movement of the vehicle is decelerated, the valve levers will swing to the dotted line positions shown in response to the deceleration to uncover the ports so that air can flow through the brakes.

Figures 6 and 7 show an alternative construction differing from the previous figures only in the manner of producing air flow, and the brake elements corresponding with identical elements in Figures 1 to 5 have been indicated by the same reference numerals.

In Figure 6 the complete wheel is illustrated as including an annular bead portion 51 extending outwardly from the wheel portion 14 which is attached to the flange 13. Beyond the bead portion 51 the wheel curves inward to carry a tire supporting rim 52.

According to the construction of Figures 6 and 7 the bead portion of the wheel is covered by a cover plate or hub cap which is especially constructed to produce a flow of air into the interior of the drum and to remove foreign material from the air. As shown, the hub cap comprises a dished plate 53 slightly larger than the bead 51 and having an axially projecting flange 54 to fit into the bead thereby to secure the hub cap to the wheel. At its center the plate 53 is formed with an air inlet opening 55 which may be a single opening, as shown, or which may, if preferred, be in the form of a grating or other ornamental construction providing for passage of air into the hub cap. The inner surface of the hub cap carries a corrugated strip 56 which provides a series of radially extending passages terminating at their inner ends adjacent the opening 55 and at their outer ends at a point spaced slightly from the periphery of the hub cap. The inner edges of the corrugated plate 56 are enclosed by a second disc 57 which extends to the periphery of the cover plate and which terminates at the periphery in a series of spaced projections or teeth 58 defining between them outlet openings for air flowing through the passages. Additionally, the periphery of the cover plate 53 is formed with a series of reduced openings 59 for the outlet of foreign material flowing through the passages.

When the wheel is rotating, the cover plate will rotate with it, and the passages formed by the corrguated plate 56 act in the manner of a centrifugal pump to draw air in through the opening 55 into the interior of the hub cap. It will be noted that as the air flows outward in the passages toward the periphery of the cover plate it is forced to turn inward so that heavy foreign material such as solid particles or water will be thrown out through the openings 59 by centrifugal force. Thus the air actually flowing into the interior of the hub cap is clean air.

This air will flow through openings 61 in the wheel and registering openings 62 in the brake drum into the interior of the brake drum to flow through the gaps 24 in the lining and out the outlet opening 19 to cool the brake in the same manner as described above in connection with Figures 1 and 2.

In order to control the flow of air so that air will flow through the brake only during actual braking operations, a control valve may be provided in the form of a disc 63 rotatably mounted on a hub portion 64 on the inner plate 67. The disc 63 is formed at its periphery with outwardly extending teeth 65 of a width approximately equal to the space between the teeth 58. With this construction when the plate 63 is turned to a position in which the teeth 65 and 58 are out of register, the outlet ends of the passages formed by the corrugated plate 56 will be closed so that no air can enter the brake drum. A spring 66 is provided normally to urge the plate 63 to this position. During deceleration the inertia of the plate 63 which may be augmented by weights 67 carried thereby will turn the plate 63 against the spring 66 to move the teeth 65 into register with the teeth 58 so that the spaces beween them will register and will define passages through which the air can flow into the brake. Thus, when this valve construction is used, air is admitted to the brake only during actual braking operations.

While three embodiments of the invention have been shown and described in detail herein, it will be understood that they are illustrative only and are not to be taken as a definition of the scope of the invention, reference being had for this purpose to the appended claims.

What is claimed is:

1. A brake comprising a rotatable drum, a backing plate mounted adjacent to the drum and spaced from the drum periphery to leave an annular air outlet opening between the backing plate and the peripheral edge of the drum, a wheel structure connected to the drum at the end thereof opposite to the backing plate, and a cover member carried by the wheel structure and rotatable with the drum and formed with radially extending passages communicating with atmosphere adjacent the center of the cover and with the interior of the drum at their outer ends.

2. A brake comprising a rotatable drum having an internal cylindrical braking surface, a support mounted adjacent to the drum and spaced from the drum periphery to leave an air outlet opening, and a cover member carried by and lying outside of the drum and rotatable with the drum and formed with radially extending passages communicating with atmosphere adjacent the center of the cover and with the interior of the drum at their outer ends, a valve member rotatably mounted in the cover and having spaced projections thereon to close the passages in one position of rotation of the valve member, and a spring resiliently urging the valve member to said one position.

3. A brake comprising a rotatable drum having a flat end and a cylindrical flange open at the other end of the drum, a support mounted adjacent to the drum and spaced from the open end of the cylindrical flange to leave an air outlet opening, a wheel secured to the flat end of the drum, a hub cap secured to the wheel, the hub cap having a central opening and means forming radially extending passages from the central opening toward the periphery of the hub cap to draw air through the opening into the interior of the hub cap, the hub cap having reduced openings at its periphery for centrifugal discharge of foreign material, and the flat end of the drum and the wheel being formed with registering openings radially inward of the hub cap periphery establishing communication between the interior of the hub cap and the interior of the brake drum.

4. A brake for a vehicle wheel comprising a brake drum having an internal cylindrical braking surface, a support mounted adjacent to one end of the drum and spaced therefrom to define a peripheral air outlet opening, a plurality of arcuate brake segments mounted within the drum for movement toward and away from the braking surface, friction lining material on the outer surfaces of the segments having gaps therein extending from edge to edge of the segments to define air passages exposed to the braking surface, a cylindrical flange on the support underlying and fitting closely against the segments substantially to prevent flow of air across the segments except through the air passages, means defining an air inlet passage communicating with the interior of the drum, means outside of the drum to force air through the passage into the drum, and valve means controlled in response to deceleration of the drum to control the flow of air through the passage.

5. A brake for a vehicle wheel comprising a brake drum having an internal cylindrical braking surface, a support mounted adjacent to one end of the drum and spaced therefrom to define a peripheral air outlet opening, a plurality of arcuate brake segments mounted within the drum for movement toward and away from the braking surface, friction lining material on the outer surfaces of the segments having gaps therein extending from edge to edge of the segments to define air passages exposed to the braking surface, a cylindrical flange on the support underlying and fitting closely against the segments substantially to prevent flow of air across the segments except through the air passages, the drum having a radial web at its other end formed with air inlet openings inward from its periphery, a hub cap secured to the web radially beyond the openings, the hub cap having a central air inlet opening, and means in the hub cap defining radially extending air passages from the central opening toward the periphery of the hub cap.

ADIEL Y. DODGE.

References Cited in the file of this patent

UNITED STATES PATENTS

| Number | Name | Date |
|---|---|---|
| 1,671,443 | Norris | May 29, 1928 |
| 1,905,657 | Tarbox | Apr. 25, 1933 |
| 1,922,318 | Mulder | Aug. 15, 1933 |
| 1,956,855 | Colgren | May 1, 1934 |
| 1,966,169 | Forbes | July 10, 1934 |
| 2,129,115 | Best | Sept. 6, 1938 |
| 2,181,008 | Bonzack | Nov. 21, 1939 |
| 2,198,027 | Farmer | Apr. 23, 1940 |
| 2,198,028 | Farmer | Apr. 23, 1940 |
| 2,299,796 | Chase | Oct. 27, 1942 |
| 2,447,021 | Lyon | Aug. 17, 1948 |

FOREIGN PATENTS

| Number | Country | Date |
|---|---|---|
| 807,511 | France | Jan. 14, 1937 |